(12) United States Patent
Genc et al.

(10) Patent No.: US 7,190,331 B2
(45) Date of Patent: Mar. 13, 2007

(54) SYSTEM AND METHOD FOR MEASURING THE REGISTRATION ACCURACY OF AN AUGMENTED REALITY SYSTEM

(75) Inventors: Yakup Genc, Plainsboro, NJ (US); Nassir Navab, Plainsboro, NJ (US); Mihran Tuceryan, Plainfield, IN (US); Erin McGarrity, East Lansing, MI (US)

(73) Assignee: Siemens Corporate Research, Inc., Princeton, NJ (US)

( * ) Notice: Subject to any disclaimer, the term of this patent is extended or adjusted under 35 U.S.C. 154(b) by 455 days.

(21) Appl. No.: 10/166,226

(22) Filed: Jun. 6, 2002

(65) Prior Publication Data

US 2003/0227470 A1 Dec. 11, 2003

(51) Int. Cl.
*G09G 5/00* (2006.01)
*G09G 5/02* (2006.01)

(52) U.S. Cl. .................... 345/9; 345/7; 345/8; 345/633

(58) Field of Classification Search ................ 345/7–9, 345/173, 174, 633, 636, 638
See application file for complete search history.

(56) References Cited

U.S. PATENT DOCUMENTS

| | | | | |
|---|---|---|---|---|
| 5,495,576 | A * | 2/1996 | Ritchey ...................... 345/420 |
| 6,064,749 | A * | 5/2000 | Hirota et al. ................ 382/103 |
| 6,433,760 | B1 * | 8/2002 | Vaissie et al. .................. 345/8 |
| 6,625,299 | B1 * | 9/2003 | Meisner et al. ............. 382/103 |
| 2002/0036617 | A1 * | 3/2002 | Pryor .......................... 345/156 |
| 2002/0075286 | A1 * | 6/2002 | Yonezawa et al. .......... 345/679 |
| 2002/0140709 | A1 * | 10/2002 | Sauer et al. ................. 345/633 |
| 2002/0154070 | A1 * | 10/2002 | Sato et al. ...................... 345/8 |
| 2003/0032484 | A1 * | 2/2003 | Ohshima et al. .............. 463/43 |
| 2005/0203367 | A1 * | 9/2005 | Ahmed et al. ............... 600/407 |

OTHER PUBLICATIONS

Balakrishnan, R. et al. "User Interfaces for Volumetric Displays, "0 IEEE Computer, vol. 34, issue 3, Mar. 2001, pp. 37-45.*
Tuceryan et al., "Single Point Active Alignment Method (SPAAM) for Optical See-through HMD Calibration for AR", In International Symposium for Augmented Reality, pp. 149-158, Munich, Germany, Oct. 2000.

* cited by examiner

*Primary Examiner*—Kee M. Tung
*Assistant Examiner*—Michelle K. Lay
(74) *Attorney, Agent, or Firm*—Donald B. Paschburg; F. Chau & Associates, LLC

(57) ABSTRACT

A method for determining registration accuracy of an augmented reality system is provided. The method includes the steps of providing an input device for inputting a position of a user's touch; registering the input device with a workspace coordinate system of the augmented reality system; displaying a virtual object in a known position; recording a user's touch position in response to the user attempting to touch the virtual object; and calculating a registration error of the augmented reality system by comparing the user's touch position to the known position of the virtual object. The input device may be a passive device used in conjunction with a tracking system of the augmented reality system or an active device, such as a touch-sensitive device, coupled to the augmented reality system which outputs the user's touch position.

19 Claims, 7 Drawing Sheets

SYSTEM AND METHOD FOR MEASURING THE REGISTRATION ACCURACY OF AN AUGMENTED REALITY SYSTEM

BACKGROUND OF THE INVENTION

1. Field of the Invention

The present invention relates generally to augmented reality, and more particularly, to a system and method for measuring the registration accuracy of an augmented reality system, i.e., for measuring how well computer generated graphics align to real-world objects or images of real world objects in the augmented reality system.

2. Description of the Related Art

Augmented reality is the technology in which a user's view of the real world is enhanced with additional information generated from a computer model, i.e., the virtual. The enhancements may include labels, 3D rendered models, or shading and illumination changes. Augmented reality allows a user to work with and examine the physical world, while receiving additional information about the objects in it. Some target application areas of augmented reality include computer-aided surgery, repair and maintenance, facilities modification, and interior design.

In a typical augmented reality system, the view of a real scene is augmented by superimposing computer-generated graphics on this view such that the generated graphics are properly aligned with real-world objects as needed by the application. The graphics are generated from geometric models of both virtual objects and real objects in the environment. In order for the graphics and video of the real world to align properly, the pose and optical properties of real and virtual cameras of the augmented reality system must be the same. The position and orientation (pose) of the real and virtual objects in some world coordinate system must also be known. The locations of the geometric models and virtual cameras within the augmented environment may be modified by moving its real counterpart. This is accomplished by tracking the location of the real objects and using this information to update the corresponding transformations within the virtual world. This tracking capability may also be used to manipulate purely virtual objects, ones with no real counterpart, and to locate real objects in the environment. Once these capabilities have been brought together, real objects and computer-generated graphics may be blended together, thus augmenting a dynamic real scene with information stored and processed on a computer.

In order for augmented reality to be effective, the real and virtual objects must be accurately positioned relative to each other, i.e., registered, and properties of certain devices must be accurately specified. This implies that certain measurements or calibrations need to be made. These calibrations involve measuring the pose, i.e., the position and orientation, of various components such as trackers, cameras, etc. What needs to be calibrated in an augmented reality system and how easy or difficult it is to accomplish this depends on the architecture of the particular system and what types of components are used.

A well-calibrated optical see-through system should be able to accurately register the virtual and the real in the user's view. However, errors in calibration and tracking or pose estimation may cause incorrect superimposition of the virtual and the real. For example, the virtual objects may appear to "lag behind" their real counterpart as the user moves around or the virtual objects may appear to "swim around" the real objects, instead of staying registered with them. An objective assessment of these errors needs to be made and some sort of error metric has to be established.

Objectively assessing the registration error has not been completely addressed within the augmented reality community. There is no good objective method around that can measure how good the alignment of the virtual and real in the user's eyes is. There has been two main approaches to the problem: 1) Relying on the user to report the qualitative accuracy of the alignment (possibly as "acceptable", "good" or "not acceptable") or 2) Using a camera to replace the human eye and conducting image-based measurements to assess the accuracy of the alignment. The former method is quick and easy, but it does not give a quantitative measure and, more importantly, it is subjective. The latter method, which is based on replacing the human eye with a camera, does not guarantee that the measured accuracy will be observed by the user since the camera is only an approximation of the human eye. Furthermore, the latter method is very tedious process that cannot be repeated as the need arises and must be performed offline since the camera is mounted where the user's head would normally go.

SUMMARY OF THE INVENTION

Accordingly, it is an object of the present invention to provide a system and method for measuring the registration accuracy of an augmented reality system.

It is another object of the present invention to provide a method for measuring the registration accuracy of an augmented reality system which is objective and can be performed while the augmented reality system is running, i.e., is online.

It is a further object of the present invention to provide a method for measuring the registration accuracy of an augmented reality system which provides quantitative measurements of registration errors as well as information on how to correct the current calibration to reduce the errors.

According to the present invention, in a system for augmenting a user's view of real-world objects with virtual objects to provide a composite augmented reality image, the system including a display device for displaying the composite augmented reality image to the user, a tracking system for locating real-world objects, and a processor for determining the position and orientation of the user's view based on the location of the real-world objects, for projecting the virtual objects onto the display device, and for processing a method for determining registration accuracy of the system is provided including the steps of (a) calibrating the tracking system; (b) calibrating the display device; (c) providing an input device for inputting a position of the user's touch; (d) registering the input device with a coordinate system of the system; (e) displaying a virtual object in a known position; (f) recording a user's touch position in response to the user attempting to touch the virtual object; (g) calculating a registration error of the system by comparing the user's touch position to the known position of the virtual object; repeating steps (e), (f), and (g), wherein for each repetition of the steps displaying the virtual object in a different known location; and reconstructing an error field of the system by determining residual distances between actual positions of the virtual objects and reconstructed positions of the virtual objects.

The method further includes the step of, after calculating a predetermined number of registration errors, recalibrating the display device and tracking system for an acceptable registration accuracy, or modifying the current calibration of the display device and tracking system to account for the calculated errors. Additionally, the method includes the step of identifying structured errors of the system.

According to another aspect of the present invention, in a system for augmenting a user's view of real-world objects with virtual objects to provide a composite augmented reality image, the system including a display device for displaying the composite augmented reality image to the user, a tracking system for locating real-world objects, and a processor for determining the position and orientation of the user's view based on the location of the real-world objects and for projecting the virtual objects onto the display device, an apparatus for determining registration accuracy of the system is provided. The apparatus includes an input device for determining a position of the user's touch, the input device being registered with a coordinate system of the system, wherein when a virtual object is displayed in a known position on the input device, the user's touch position is recorded in response to the user attempting to touch the virtual object; and the processor includes means for calculating a registration error of the system and means for comparing the user's touch position to the known position of the virtual object.

According to a further aspect of the present invention, the tracking system is a magnetic tracking system including a transmitter, a marker receiver and a digitizing stylus and the input device of the apparatus is a designated planar surface, wherein the user's touch position is determined by a position of the stylus in relation to the planar surface by the tracking system.

According to another aspect of the present invention, the tracking system is a video-based infrared tracking system including a camera with an infrared filter and a ring of LEDs mounted to the camera and the input device of the apparatus is a graphic tablet including a set of fiducials with known geometry, wherein the user's touch position is determined by a position of a user's finger in relation to the graphic tablet by the tracking system.

Furthermore, the input device of the apparatus may be a touch-sensitive device coupled to the processor of the system.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Generally, an augmented reality (AR) system includes a display device for presenting a user with an image of the real world augmented with virtual objects, a tracking system for locating real-world objects, and a processor, e.g., a computer, for determining the user's point of view and for projecting the virtual objects onto the display device in proper reference to the user's point of view.

AR systems can be broadly categorized by the type of display they use. The first class is known as video see-through. Video see-through systems use a camera and display as an intermediary between the user and the real world scene. A video stream is captured by the camera, augmented and passed on to the user via a head-mounted display (HMD) or monitor. The second class of AR systems is called optical see-through systems. Optical see-through systems place optical combiners in front of a user's eyes, usually via a HMD. The combiners let light and images in from the real world and also reflect light from monitors displaying graphic images, resulting in a combination of the real world and virtual objects. The method of the present invention will be described with reference to two different optical see-through AR systems. The first system is based on a magnetic tracker. The second system uses an infrared video-based tracker.

Figure 1:
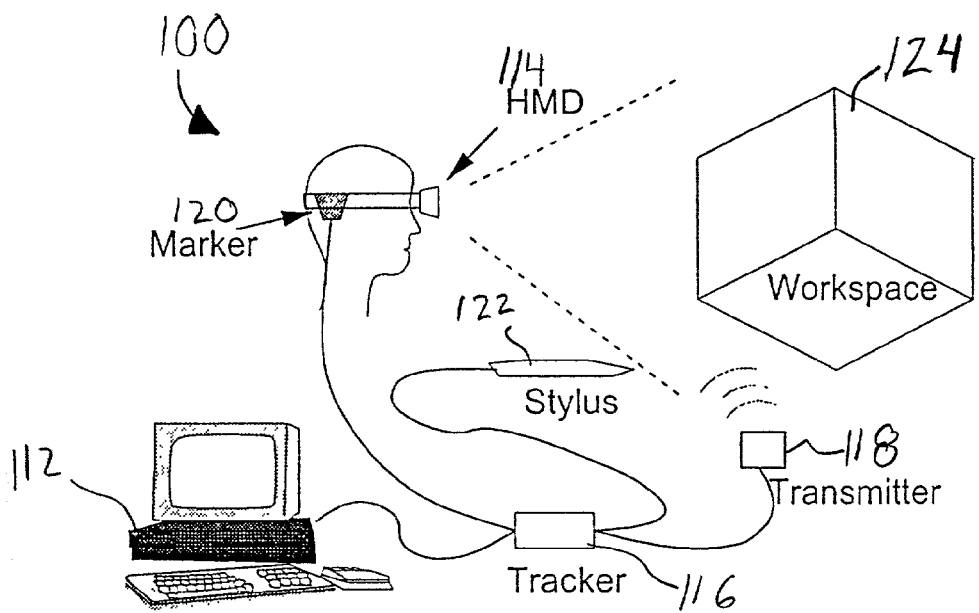
FIG. 1 is a schematic diagram of an optical see-through augmented reality system utilizing magnetic tracking.

Referring to FIG. 1, an optical see-through AR system 100 with magnetic tracking includes a workstation 112, a HMD 114 and a magnetic tracker 116. An exemplary HMD 114 for this AR system 100 is a Sony Glastron LD-100B, which has a resolution of 800×600 pixels per eye, a refresh rate of 60 Hz and a frame-sequential stereo mode. The magnetic tracker 116 is a Polhemus Isotrak II with a single transmitter 118 and two receivers: a marker 120 and a digitizing stylus 122. The tracker 116 is capable of sensing the position and orientation of the receivers at ranges of up to one meter. The marker 120 is rigidly attached to the HMD 114 to track the user's head motion during runtime. The stylus 122 can be used to measure the coordinates of real objects in workspace 124 at runtime. The stylus 122 can also be used to interact with virtual objects in the workspace 124.

Figure 2:
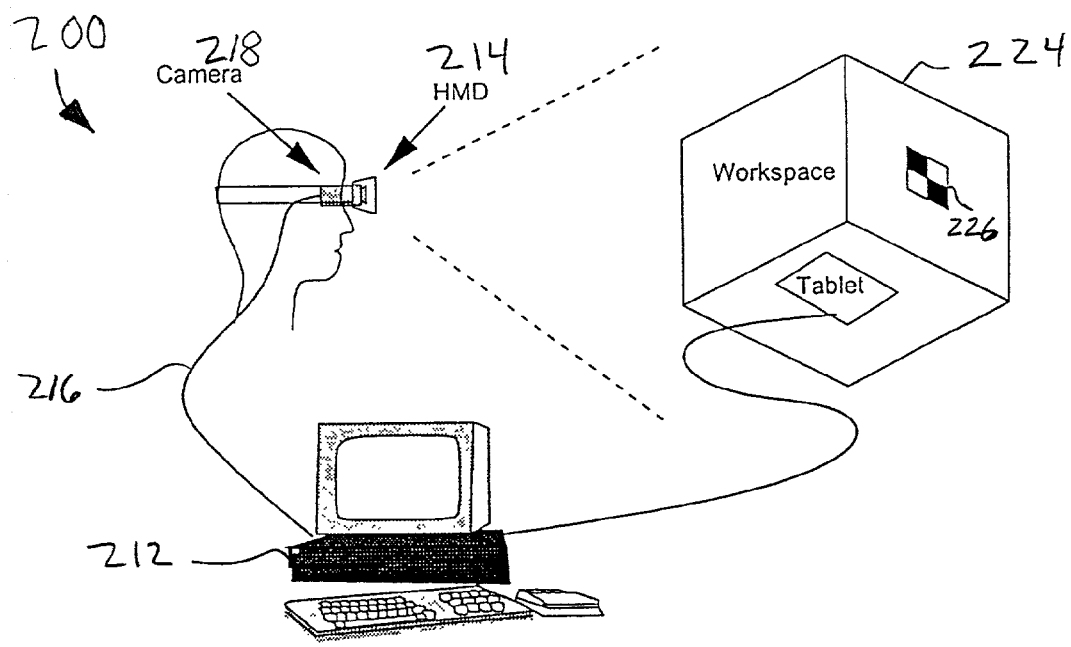
FIG. 2 is a schematic diagram of an optical see-through augmented reality system utilizing infrared video-based tracking.

Referring to FIG. 2, the second optical see-through system 200 which employs a video-based tracker is illustrated. The HMD 214 for this system is a Virtual IO i-glasses™ field-sequential stereo display. It has stereo a resolution of 640×240 pixels per eye with a refresh rate of 60 Hz. The monocular resolution for this display 214 is 640×480. An infrared vision-based tracker 216 provides the system 200 with position and orientation of the tracker camera 218 attached to the HMD 214.

The infrared video-base tracker 216 estimates the pose of a set of fiducials or markers 226 with known geometry made of retro-reflective material placed in a specific location in a workspace 224. It uses a camera assembly 218 which is mounted to the HMD 214. This assembly consists of a CCD camera with an infrared filter and a ring of infrared LEDs mounted around the barrel of the camera. Video obtained from the camera is processed in the processor 212 to identify the images of the retroreflective markers 226. Because the video captured is filtered, the only visible items will be the ones corresponding to the retroreflective markers, i.e., items reflecting light in an infrared frequency. Since the location of the markers are known within a specific workspace 224, the processor can determine the pose of the camera and/or user.

While working in an AR system, it is important to have a reference coordinate system, which the locations of the real and virtual objects can be specified in. In practice, this coordinate system is in a fixed location such as a table or workspace 124, 224. While the system is running, the user's head must be tracked in some way, e.g., magnetic tracker, video tracker, so that the virtual objects stay aligned with the real objects as the user moves around. Since this motion is measured in the tracker coordinate system (TCS) and the objects are in the workspace coordinate system (WCS), it is necessary to find a transformation between them so that the graphics can be rendered properly.

Figure 3:
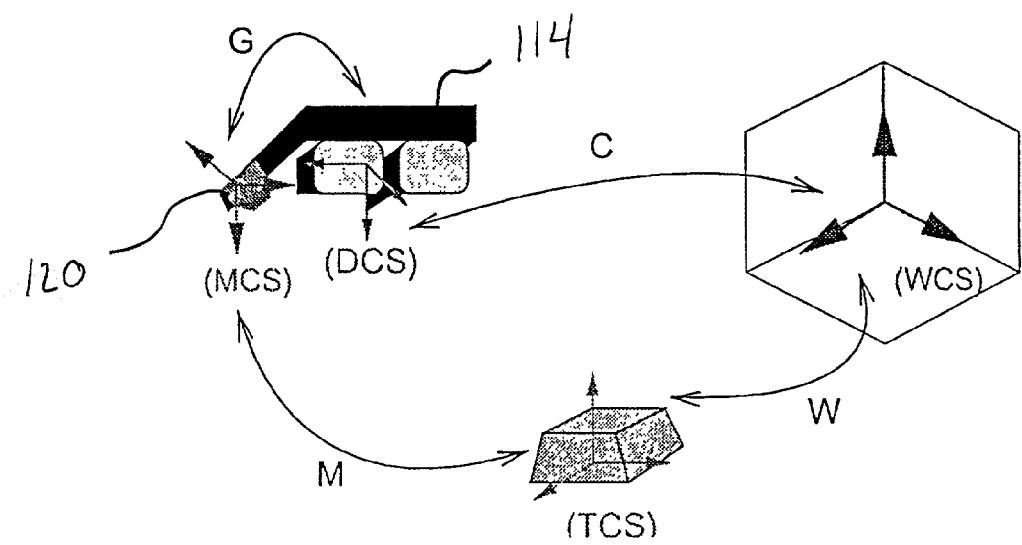
FIG. 3 illustrates the coordinate transformations in an augmented reality system utilizing a magnetic tracking system.

FIG. 3 shows the coordinate systems used in the magnetically tracked system of FIG. 1. The bi-directional arrows indicate the coordinate transformations which must be either measured or calibrated during system operation. In the FIG. 3, $W_{4\times4}$ represents the rigid transformation between the WCS and the TCS. This can be computed by performing a rigid or affine alignment as is known in the art. Experimental results suggest that the affine method tends to work best since it provides a linear approximation to the aberrations in the magnetic field without resorting to polynomial field adjustment. $M_{4\times4}$ is the transformation from the tracker origin to the marker 120, which is attached to the HMD 114. This transformation is measured by the tracking system and reported at each timestep. $G_{3\times4}$ is the transformation from the marker coordinate system (MCS) to the HMD/eye coordinate system (DCS). This transformation is combination of rigid and projective. It can be estimated using the single point active alignment method (SPAAM) as disclosed in "Single point active alignment method (SPAAM) for optical see-through HMD calibration for AR" by M. Tuceryan and N. Navab, International Symposium for Augmented Reality, pages 149–158, Munich Germany October 2000, the contents of which are incorporated by reference. During runtime, the most important transformation is $C_{3\times4}$, which is the transformation that the graphics or virtual objects are rendered with. This transformation is computed by concatenating the former 3 transformations, i.e., $$C=GMW \quad (1)$$

Similarly, the coordinate systems for the visually tracked system 200 are the same with the following clarifications: TCS is the coordinate system representing the visual marker 226, and MCS is the coordinate system for the tracker camera 218. Consequently, the calibration of the two corresponding transformations are different, but are well known in the art.

When designing a scheme to evaluate an AR system, there are many factors to consider. First, the procedure must include the user. Schemes which replace the user with a camera and a rigid mounting fixture do not reflect the situation properly. In fact, much of the error observed in an AR system is from the user. During HMD calibration, for instance, if the user raises their eyebrows, the display moves with respect to the eye and error is introduced into the system.

Another important factor in designing an evaluation system is task complexity. The amount of error a user introduces into the system is reflected in the difficulty of the calibration and evaluation tasks. Also, the evaluation task must be designed so it does not give cues to the user, which could influence the results.

A third feature an evaluation scheme must exhibit is precision. It must provide consistent quantitative results from trial to trial. These results must give a clear indication of the accuracy that a user will perceive. It must be able to communicate this accuracy to the user through some feedback mechanism. With this and the two points above in mind, the evaluation system and method of the present invention can be laid out.

Assuming that the user has calibrated the tracking system along with the display device, graphics can be overlayed onto the real workspace with some unknown accuracy. The aim of the system and method of the present invention is to measure the registration accuracy between the virtual objects and the real objects. The results from these measurements can further be used in three different ways. First, calibration accuracy information can be obtained. This information can be used to determine the expected registration accuracy at a given distance. For instance, the system could report, "At 70 cm away from the target, the user can correctly identify items which are 1 cm apart." This is useful in determining if the calibration is good enough for a particular application. Second, structured errors in the tracking system can be identified and possibly corrected. Structured errors are errors in the system which have a regular form. For instance, a magnetic tracker may produce structured errors in part of its operating radius due to magnetic distortions caused by a metal table. Third, the structure information may be used to make corrections in the current system calibration to remove these structured errors.

Figure 4:
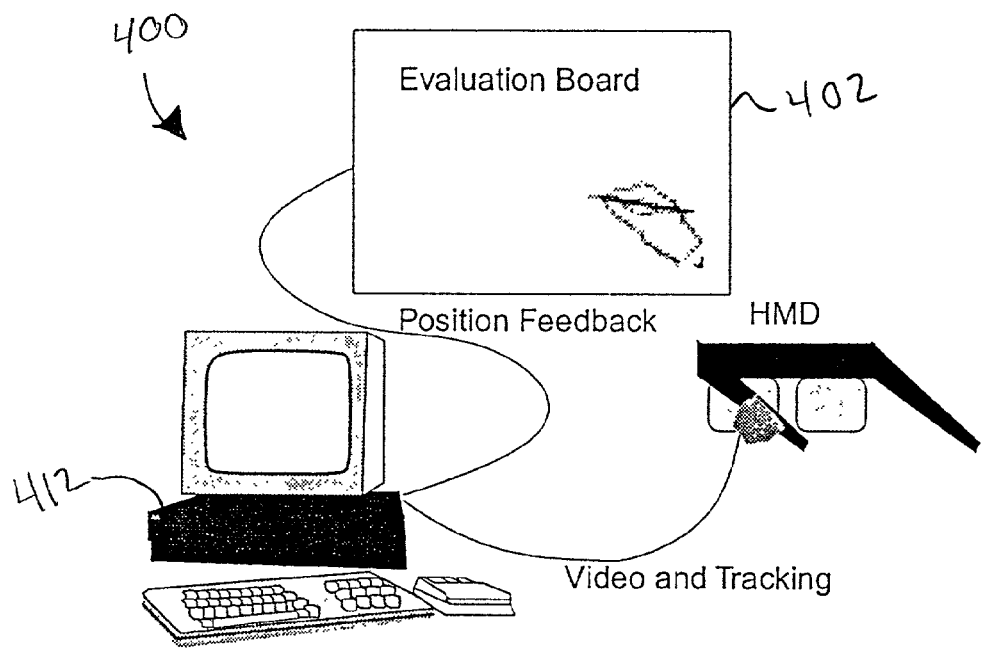
FIG. 4 is a schematic diagram of an optical see-through evaluation system for an augmented reality system in accordance with the present invention.
Figure 5:
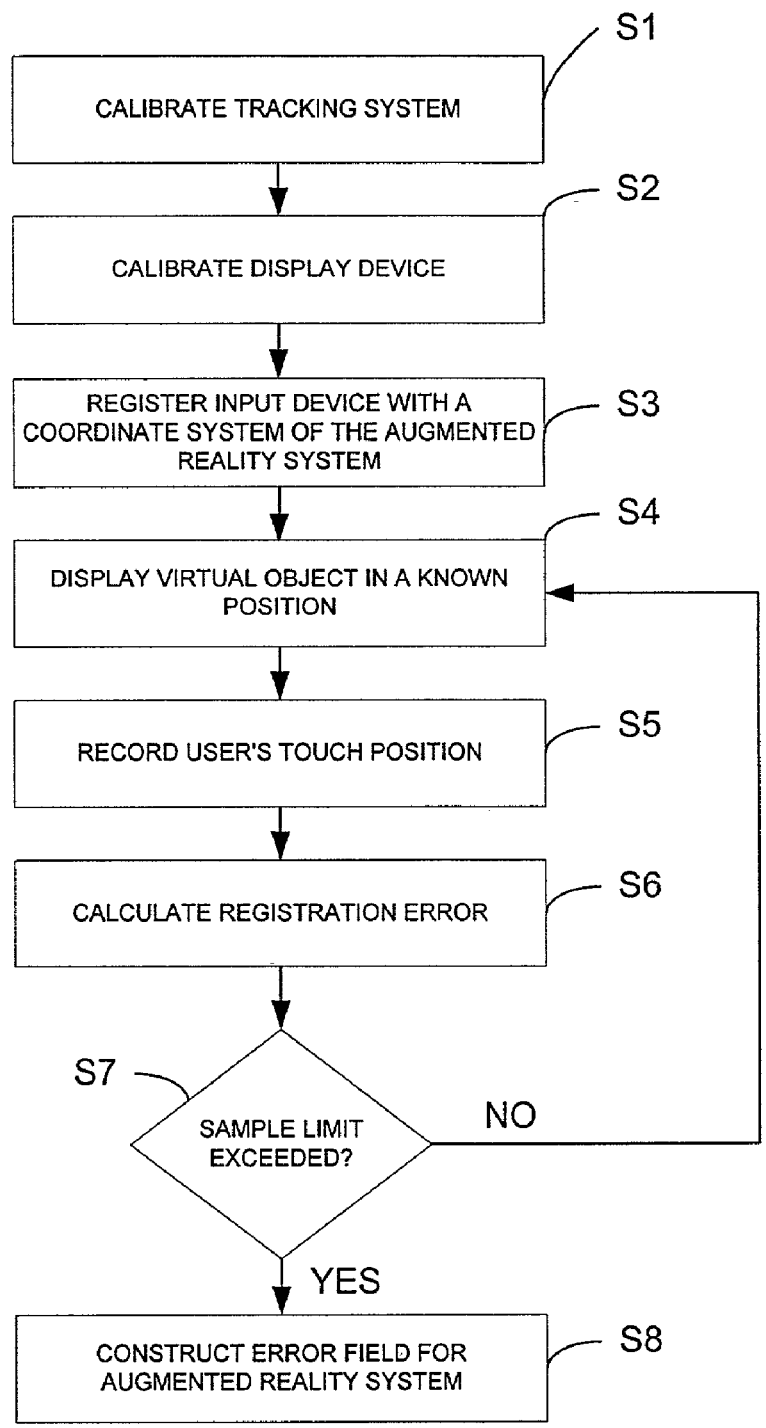
FIG. 5 is a flowchart illustrating a method for determining registration accuracy of an augmented reality system in accordance with the present invention.

Referring to FIGS. 4 and 5, the evaluation system and method for determining registration accuracy in accordance with the present invention will be described.

Generally, the evaluation system 400 includes a input device 402 capable of reading a user's touch position and a computer 412 for determining the location of the user's touch position. When used to evaluate an augmented reality system, virtual objects are projected onto the input device and the user is prompted to touch the position where they perceive the virtual object to be. The input device must be registered into the workspace coordinate system of the augmented reality system being evaluated. Once the computer determines the position of the user's touch, the computer compares the position to the position of the virtual object to determine an error in registration of the two positions.

The input device can be a passive device, such as a planar board or graphics tablet, which determines a real world position through the tracking system of the augmented reality system. In this scenario, the input device is laid out in a workspace untethered to other components of the augmented reality system and the tracking system is used to determine the position of the user's touch. Here, the computer is the processor of the augmented reality system. For example, in the case of the magnetic tracking system, the tracker's stylus can be used in conjunction with a planar board. For a video-based tracking system, the input device may be a graphics tablet with fiducials on it so it can be tracked.

Furthermore, the input device can be an active device, such as a touch-pad screen or touch-sensitive board, which measures and outputs a real world position. For the active device, the input device may be coupled to a stand-alone computer which outputs the position information to the augmented reality system or the active input device may be directly coupled to the processor of the augmented reality system.

Before the evaluation method can begin the augmented reality system must be calibrated. First, the tracking system is calibrated in Step S1 and then the optical see-through HMD is calibrated for a current user, Step S2. The input device is then registered with the workspace coordinate system of the augmented reality system in Step S3.

After calibration, the system displays a virtual object in the user's view, Step S4. The object should be on a known position (to the evaluation system only) on the input device or evaluation board. The user is asked to press (or touch or enter depending on the technology used) on the virtual object, which the user should see as superimposed on the input device. In Step S5, the system reads in the user input and computes the corresponding three-dimensional position. The system compares the user input against the actual position of the virtual object known by the evaluation system, Step S6. The evaluation method is repeated for differently placed objects (different locations on the input device or board) for a predetermined sample number, Step S7. The system keeps statistics of errors in measurement of the different points, Step S8, to be used as described below.

Figure 6:
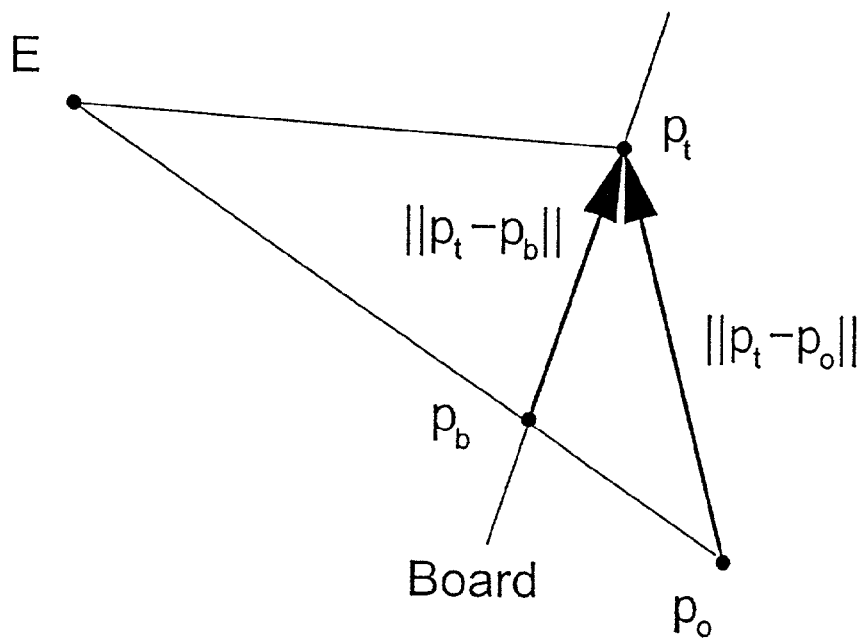
FIG. 6 illustrates the geometry of three points used to calculate a registration error by the evaluation system in accordance with the present invention.

From the evaluation data, there are three points of interest $p_t$, $p_o$, and $p_b$. FIG. 6 shows the geometry of the 3 points. A first point, $p_t$, is the theoretical location of the virtual point in the workspace coordinate system. The coordinates of this point should be unknown to the user so there is no bias in the results. The theoretical point is rendered in the display using the calibration parameters of the system. This produces the second point, $p_o$. $p_o$ is the location where the user perceives the point to be in the workspace. If the HMD and tracker calibrations are exact, then $p_t$ and $p_o$ will coincide. As this is not usually the case, a final point, $p_b$, must be introduced. $p_b$ is the projection of $p_o$ into the plane of the evaluation board. This point is selected by the user when they touch the board during system evaluation.

Figure 7:
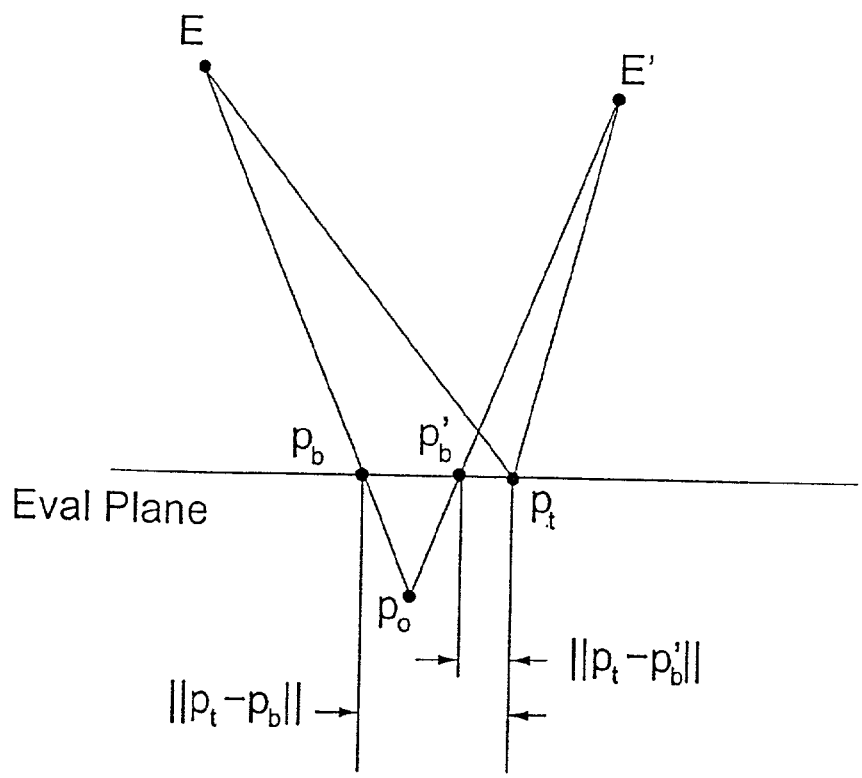
FIG. 7 illustrates the error in the plane of the evaluation board as seen from two different viewpoints, E and E'.

It is important to note that the planar error metric completely depends on the user's viewpoint. FIG. 7 illustrates this point. The observed error from the viewpoint E is larger than that of E'. Also notice that from multiple views it is possible to estimate the location of $p_o$ through the use of point reconstruction techniques, as are known in the art.

Once the data has been gathered, the evaluation system computes the Euclidean distances between each of the theoretical points and their projected observed locations, i.e., $\|p_t - p_b\|$, as shown in FIG. 6. The statistics from these computed distances can be used as estimates of tolerances for the current calibration. The errors could also be used to give more direct feedback, such as drawing spheres at each of the picked locations with colors and/or radii corresponding to the amount of error, as will be described below with reference to FIG. 8. Additionally, the evaluation data can be added to the points used in the AR system calibration to improve the registration.

Experimental Results

Below, experimental results from the application of the evaluation system to the two above-described augmented reality systems are presented. The first system uses a magnetic tracker; the second uses an infrared video-based tracker. Both systems have monocular displays which were calibrated with the SPAAM method as described above. After calibration, the users invoked the evaluation system and corresponding method of the present invention.

To validate the evaluation system, eight (8) experiments were performed using the magnetically tracked system 100 of FIG. 1. For each experiment, the user calibrated the S4 HMD and was asked to run the evaluation routine three times over the same board or input device. The users were asked to confine their heads to 3 rough viewing zones, one zone per pass. The results are detailed below.

Figure 8:
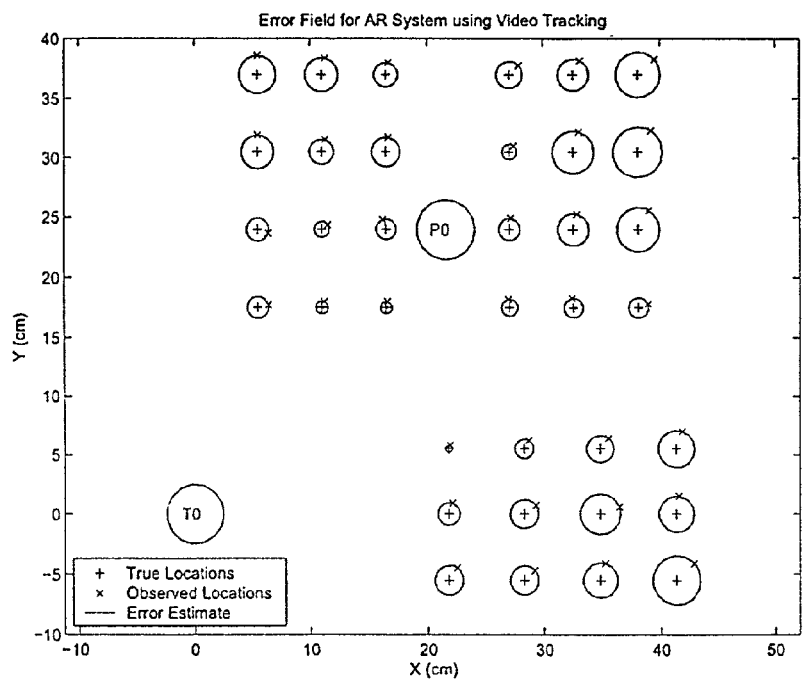
FIG. 8 is a graph illustrating the error fields for an augmented reality system utilizing infrared video-based tracking.

The results for the video-based system are shown in FIG. 8. In this plot, the + symbols represent the actual locations of the points provided by the evaluation system, i.e., the virtual points, and the x symbols show the observed locations. The circles provide visual feedback of the errors at each location. Notice that the errors tend to be worse for points which are further away from the tracking origin $T_0$. (In FIG. 8, $P_0$ is the calibration origin or the scene point that is used to calibrate the HMD using the SPAAM method.) The likely source of this error is radial distortion in the tracking camera, which was not factored in during camera calibration.

Figure 9:
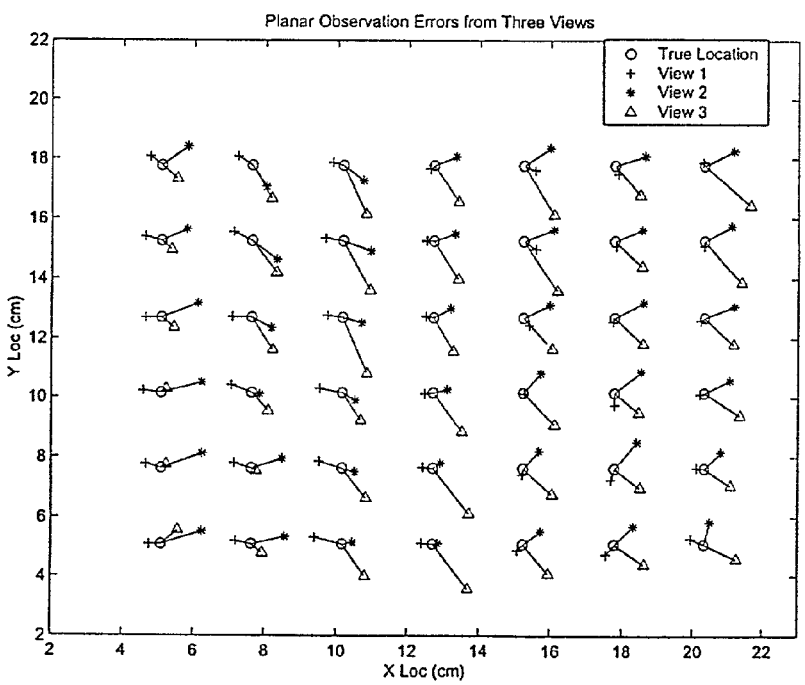
FIG. 9 is a graph illustrating the error fields for an augmented reality system utilizing magnetic tracking.

The results from a typical user of the magnetically tracked system are shown in FIG. 9. This plot shows the theoretical locations as circles along with their observed locations from three different views or zones in the workspace. These zones are defined as the 3-dimensional regions to which the users' heads were confined when the observations were made. The range of head motion was restricted because the users were seated during the evaluation procedures.

Figure 10:
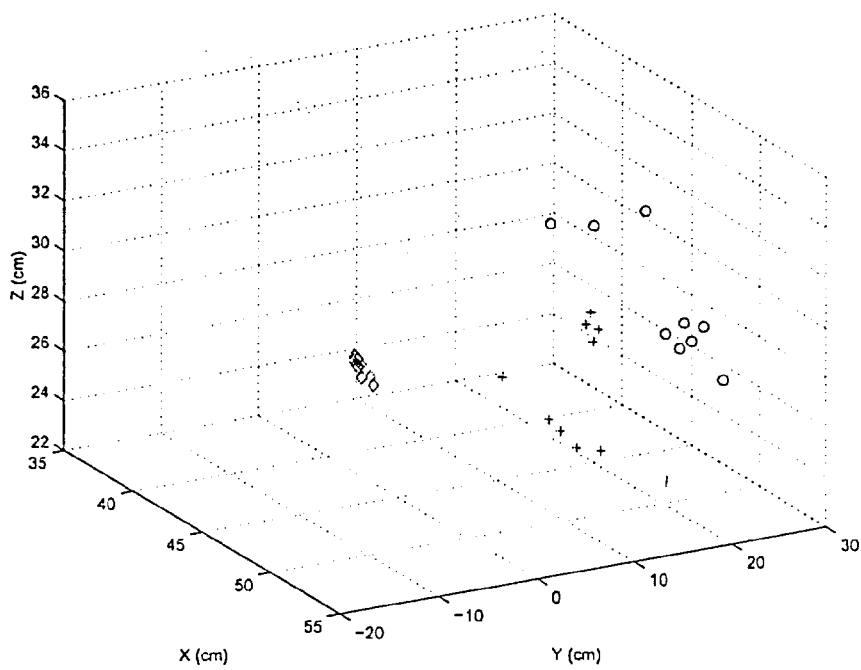
FIG. 10 illustrates three dimensional viewing zones for an evaluation run.

FIG. 10 shows an example of the three dimensional viewing zones for an evaluation run. The theoretical points were placed in the plane z=−0.63 cm. The users recorded observations by clicking, i.e., touching, the observed location with the stylus from the magnetic tracker. The observations of the points from the three viewing zones are indicated on the plot by pluses, stars and triangles. The mean and maximum errors for each zone and the global errors are tabulated in Table 1. Table 2 shows the mean errors and Table 3 shows the maximum errors for eight different user sessions. For these eight sessions there were six users. The errors shown in rows 1 and 2 and rows 3 and 4 are from the same users during two different sessions.

TABLE 1

| Observation | Zone 1 (cm) | Zone 2 (cm) | Zone 3 (cm) |
| --- | --- | --- | --- |
| Mean Error | 0.7 | 1.1 | 0.3 |
| Max Error | 1.2 | 1.7 | 0.5 |

TABLE 2

| Zone 1 (cm) | Zone 2 (cm) | Zone 3 (cm) |
| --- | --- | --- |
| 0.7 | 1.1 | 0.3 |
| 0.7 | 1.0 | 0.6 |
| 0.4 | 0.8 | 1.2 |
| 1.2 | 1.5 | 1.1 |
| 0.8 | 0.7 | 0.8 |
| 1.2 | 1.7 | 0.5 |

TABLE 2-continued

| Zone 1 (cm) | Zone 2 (cm) | Zone 3 (cm) |
|---|---|---|
| 1.2 | 1.6 | 0.8 |
| 1.0 | 0.7 | 0.8 |

TABLE 3

| Zone 1 (cm) | Zone 2 (cm) | Zone 3 (cm) |
|---|---|---|
| 1.2 | 1.7 | 0.5 |
| 0.9 | 1.3 | 0.9 |
| 0.8 | 1.3 | 2.0 |
| 3.2 | 2.4 | 1.8 |
| 1.7 | 1.1 | 1.2 |
| 2.3 | 2.8 | 1.2 |
| 1.9 | 2.5 | 1.2 |
| 4.7 | 3.2 | 3.0 |

From the tables it can be seen that the overall average system accuracy is 0.93 cm. The worst error observed was 4.73 cm, but this was caused by the user moving outside the effective range of the tracker. If that point is treated as an outlier, then the worst observed error was 3.23 cm.

Analysis of 3D Structured Errors

Given multiple observations of a point from different viewpoints along with its rendering parameters, it is possible to estimate its 3-dimensional location. If the 3-dimensional locations for all of the points from the evaluation task are estimated, they can be looked at collectively and reconstructed as an error field.

Figure 11:
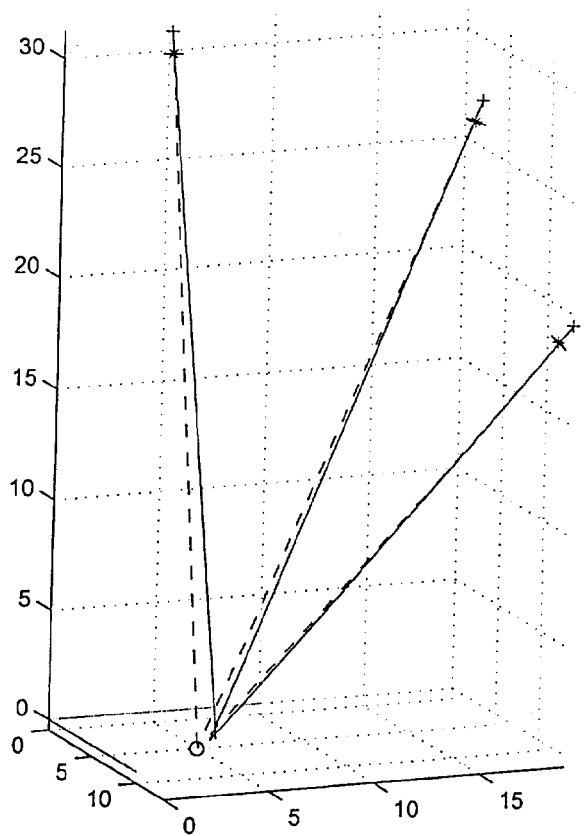
FIG. 11 illustrates an observation error constructed from three views of a user.

FIG. 11 depicts a observation error in a simulated case. In this graph, the locations of the three views are shown (indicated by the + symbol and the * symbol). The point that is being rendered, i.e., the virtual point, is shown as a circle. The observed location in the evaluation plane for each view lies at the end of the solid rays. In a system with perfect registration and tracking, the solid rays would lie exactly on top of the dashed rays. In practice, there will be positional errors and jitter errors. The positional errors cause the observed location to be different from the theoretical location and the jitter causes the rays of observation to be skew. Using this type of analysis, it is possible to characterize the errors in the augmented reality system.

To perform reconstruction of the locations of the virtual points as perceived by the user, it is first necessary to define the parameters of the system. A point in the workspace coordinate system $M=[x,y,z,1]^T$ is projected into the image plane at location $m=[u,v,1]^T$ with the standard rendering equation, i.e., $$m = \lambda PM \quad (2)$$

where P is a 3×4 projection matrix representing the virtual camera, and $\lambda$ is an unknown scale parameter. Using Equation 2, it is possible to solve a linear system to approximate the observed 3-dimensional location of M. This estimation is computed using a standard technique from computer vision known as point reconstruction.

Figure 12:
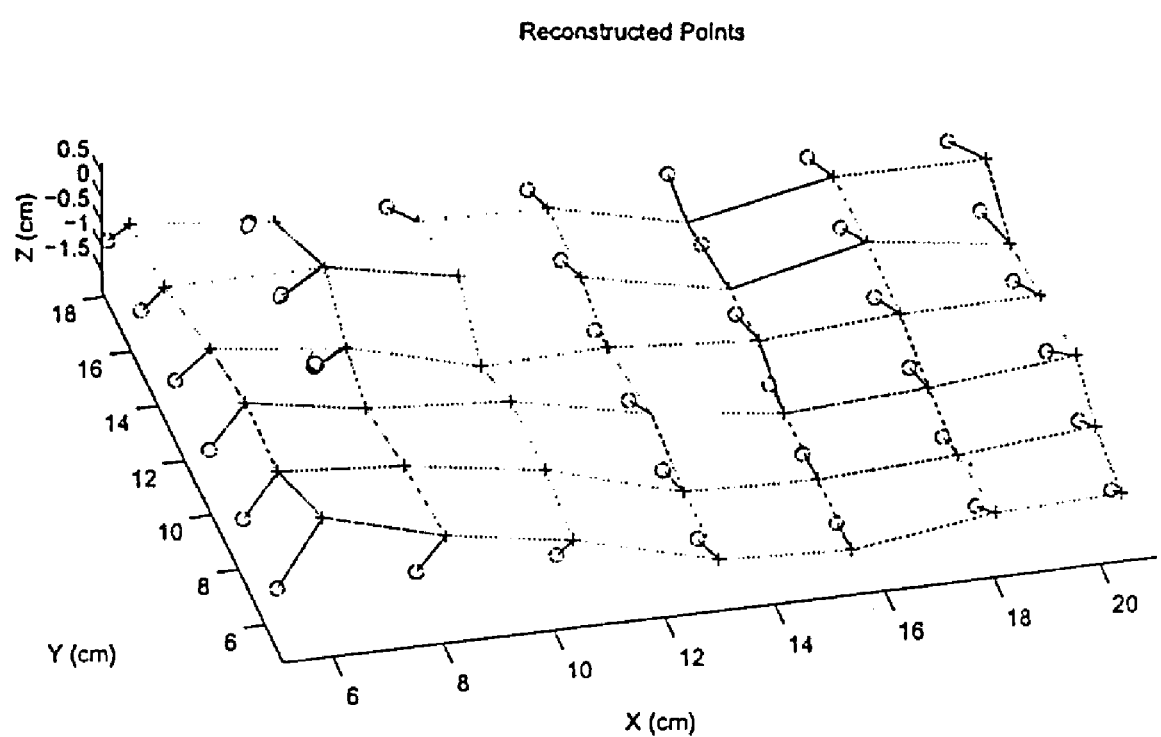
FIG. 12 illustrates a resulting error field constructed using a linear reconstruction technique.

FIG. 12 shows the resulting error field which was reconstructed by this linear technique. In this plot, the circles represent the theoretical locations of the points and the crosses and mesh represent the reconstructed locations and error field approximation.

From the point locations and residuals of the reconstruction, it is possible to characterize the system errors. A residual of the reconstruction is computed as the distance between the rendered position of the actual point and the reconstructed point in the user's view. The reconstruction error is computed as the metric distance between the calculated position of the observed point and the position of the actual point. The actual points are depicted with circles and the observed points with crosses. The residual distance between these points are represented by a line segment. If the residuals are very small, but there are significant reconstruction errors, then the error is structured and is coming from the system calibration. In this case, it should be possible to make a correction to the current calibration to compensate for the error. If, however the residuals are very large, then the system is suffering from unstructured tracker noise.

The calibration can be corrected by using the observations obtained during the evaluation. In fact, each of the user input presents an observation for the system calibration. These measurements (i.e., the rendered position of the actual point, and the position of the user's input) can be used to refine the provided calibration (e.g., using the SPAAM method). In the case of unstructured tracker noise, the evaluation system can only warn the user for the limits of registration accuracy. If the users find these limits unacceptable, they may need to recalibrate the tracker and HMD or replace the tracker with one possessing better noise characteristics.

The method of the present invention has been provided to objectively evaluate an optical see-through augmented reality system. This system differs from previous system in three ways. First, it allows a user to measure the error of the system while it is running. Second, it produces quantitative measurement of the error in registration of the real and the virtual. Finally, this error estimate includes the user as part of the system. With this system, it is possible to estimate the accuracy limits of an application and detect structured errors in an optical see-through AR system.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. In a system for augmenting a user's view of real-world objects with virtual objects to provide a composite augmented reality image, the system including a display device for displaying the composite augmented reality image to the user, a tracking system for locating real-world objects, and a processor for determining the position and orientation of the user's view based on the location of the real-world objects, for projecting the virtual objects onto the display device, and for processing a method for determining registration accuracy of the system comprising the steps of:
    (a) calibrating the tracking system;
    (b) calibrating the display device;
    (c) providing an input device for inputting a position of the user's touch;
    (d) registering the input device with a coordinate system of the system;
    (e) displaying a virtual object in a known position superimposed on said input device;
    (f) recording a user's touch position in response to the user attempting to touch the virtual object;
    (g) calculating a registration error of the system by comparing the user's touch position to the known position of the virtual object;

(h) repeating steps (e), (f), and (g), wherein for each repetition of the steps displaying the virtual object in a different known location; and (i) reconstructing an error field of the system by determining residual distances between actual positions of the virtual objects and reconstructed positions of the virtual objects.

2. The method as in claim 1, further comprising the step of identifying errors of the system, wherein if the residual distances are small, the system error is structured and, if the residual distances are large, the system error is unstructured tracker noise.

3. The method as in claim 1, wherein the recording step further comprises the step of computing a three-dimensional position of the user's touch position.

4. The method as in claim 1, further comprising the step of, after calculating a predetermined number of registration errors, recalibrating the display device and tracking system for an acceptable registration accuracy.

5. The method as in claim 1, further comprising the step of, after calculating a predetermined number of registration errors, modifying the current calibration of the display device and tracking system to account for the calculated errors.

6. The method as in claim 1, wherein the tracking system is a magnetic tracking system including a transmitter, a marker receiver and a digitizing stylus and the input device is a designated planar surface, the recording step further comprising determining the user's touch position by determining a position of the stylus in relation to the planar surface by the tracking system.

7. The method as in claim 1, wherein the tracking system is a video-based infrared tracking system including a camera with an infrared filter and a ring of LEDs mounted to the camera and the input device is a graphic tablet including a set of fiducials with known geometry, the recording step further comprising determining the user's touch position by determining a position of a user's finger in relation to the graphic tablet by the tracking system.

8. The method as in claim 1, wherein the input device is a touch-sensitive device coupled to the processor.

9. In a system for augmenting a user's view of real-world objects with virtual objects to provide a composite augmented reality image, the system including a display device for displaying the composite augmented reality image to the user, a tracking system for locating real-world objects, and a processor for determining the position and orientation of the user's view based on the location of the real-world objects and for projecting the virtual objects onto the display device, an apparatus for determining registration accuracy of the system comprising:

an input device for determining a position of the user's touch, the input device being registered with a coordinate system of the system, wherein when a virtual object is displayed in a known position superimposed on the input device, the user's touch position is recorded in response to the user attempting to touch the virtual object, and the processor includes means for calculating a registration error of the system and means for comparing the user's touch position to the known position of the virtual object.

10. The apparatus as in claim 9, wherein the processor computes a three-dimensional position of the user's touch position.

11. The apparatus as in claim 9, wherein, after calculating a predetermined number of registration errors, the processor recalibrates the display device and tracking system for an acceptable registration accuracy.

12. The apparatus as in claim 9, wherein, after calculating a predetermined number of registration errors, the processor modifies the current calibration of the display device and tracking system to account for the calculated errors.

13. The apparatus as in claim 9, wherein the processor identifies structured errors of the system.

14. The apparatus as in claim 9, wherein the tracking system is a magnetic tracking system including a transmitter, a marker receiver and a digitizing stylus and the input device is a designated planar surface, wherein the user's touch position is determined by a position of the stylus in relation to the planar surface by the tracking system.

15. The apparatus as in claim 9, wherein the tracking system is a video-based infrared tracking system including a camera with an infrared filter and a ring of LEDs mounted to the camera and the input device is a graphic tablet including a set of fiducials with known geometry, wherein the user's touch position is determined by a position of a user's finger in relation to the graphic tablet by the tracking system.

16. The apparatus as in claim 9, wherein the input device is a touch-sensitive device coupled to the processor.

17. The apparatus as in claim 9, wherein the input device is a touch-sensitive device coupled to a second processor, the second processor outputting a user's touch position to the system processor.

18. The apparatus as in claim 9, wherein the user is requested to attempt to touch the virtual object.

19. In a system for augmenting a user's view of real-world objects with virtual objects to provide a composite augmented reality image, the system including a display device for displaying the composite augmented reality image to the user, a tracking system for locating real-world objects, and a processor for determining the position and orientation of the user's view based on the location of the real-world objects, for projecting the virtual objects onto the display device, and for processing a method for determining registration accuracy of the system comprising the steps of:

(a) providing an input device for inputting a position of the user's touch;

(b) registering the input device with a coordinate system of the system;

(c) displaying a virtual object in a position known only to the processor superimposed on said input device;

(d) recording a user's touch position in response to the user attempting to touch the virtual object; and (e) calculating a registration error of the system by comparing the user's touch position to the known position of the virtual object.

* * * * *